United States Patent [19]

Masuda et al.

[11] Patent Number: 4,924,329
[45] Date of Patent: May 8, 1990

[54] ROTARY DRUM APPARATUS FOR A MAGNETIC RECORDING AND REPRODUCING DEVICE

[75] Inventors: Kenmei Masuda; Kenji Ogiro; Yoshinori Okada, all of Yokohama; Akihiro Nakajima; Mashanori Kochi, both of Katsuta; Kazutoshi Konno, Tokyo, all of Japan

[73] Assignee: Hitachi, Ltd., Tokyo, Japan

[21] Appl. No.: 259,310

[22] Filed: Oct. 18, 1988

[30] Foreign Application Priority Data

Oct. 30, 1987 [JP] Japan .................. 62-273421

[51] Int. Cl.$^5$ .............................. G11B 15/14
[52] U.S. Cl. ...................................... 360/64
[58] Field of Search .............. 360/61, 62, 64, 108, 360/124

[56] References Cited

U.S. PATENT DOCUMENTS 4,605,974 12/1986 Ochi et al. .................. 360/64

FOREIGN PATENT DOCUMENTS 0121714  9/1979  Japan .................. 360/64
0163203  8/1985  Japan .................. 360/64
0242502 12/1985  Japan .................. 360/64
2173341 10/1986  United Kingdom ...... 360/64

Primary Examiner—Vincent P. Canney
Attorney, Agent, or Firm—Antonelli, Terry & Wands

[57] ABSTRACT

The present invention relates to a magnetic recording and reproducing device wherein reproduction monitoring can be made directly after recording, and more particularly to a construction of a rotary drum for the same. The magnetic recording and reproducing device includes a single recording channel for n recording magnetic heads, and n reproducing channels for n reproducing magnetic heads. The recording channel is provided either on an innermost circumference side or on an outermost circumference side of a rotary transformer. Since the device has such a reduced number of recording channels, the distance between adjacent channels can be increased and the transmission loss of a reproduction signal can be reduced.

3 Claims, 4 Drawing Sheets (HEAD 1)

(HEAD 3)

(HEAD 2)

(HEAD 4)

ROTARY DRUM APPARATUS FOR A MAGNETIC RECORDING AND REPRODUCING DEVICE

BACKGROUND OF THE INVENTION

This invention relates to a magnetic recording and reproducing device of the helical scan type, and more particularly to a magnetic recording and reproducing device having a rotary drum construction wherein reproduction monitoring can be made simultaneously with recording.

In a magnetic recording and reproducing device of the helical scan type such as a VTR (video tape recorder) or a DAT (digital audio tape recorder), a magnetic tape is fed while being wrapped over 180 degrees or more in the case of a VTR or over 90 degrees or more in the case of a DAT around an outer periphery of a head cylinder composed of a fixed drum and a rotary drum on which a magnetic head is carried while an information signal such as a video signal or a digital audio signal is recorded on or reproduced from the magnetic tape.

Similar to a tape deck of the analog type, it would be desirable for such a magnetic recording and reproducing device to have a simultaneous recording and reproduction monitoring function which enables confirmation of recording. To this end, it may be recommended to provide a recording magnetic head and a reproducing magnetic head separately on a rotary drum (for example, U.S. Pat. No. 4,628,373).

A rotary transformer is provided for electrically connecting magnetic heads on a rotary drum to signal processing circuits. The rotary transformer includes a winding provided for each of the magnetic heads (such a winding will be hereinafter referred to as a "channel"). Since at least two recording magnetic heads and two reproducing magnetic heads are required, a total of four channels including two recording channels and two reproducing channels must be provided.

If at least four channels are provided on a rotary transformer in this manner, crosstalk between the channels, particularly between the recording channels and the reproducing channels, becomes an issue, and reproduction monitoring which is conducted simultaneously with recording may be hindered.

To avoid this problem, steps have been taken such as providing a short ring between adjacent channels or to dividing the rotary transformer at least for the recording channels and the reproducing channels. However, this will narrow a magnetic path at each channel of the rotary transformer, which will result in reduction in the degree of coupling and an increase in transmission loss of a signal. This is a serious problem particularly with the reproducing channels because a signal reproduced from a magnetic tape is a feeble signal.

In order to resolve the problem, it is necessary to widen the magnetic path for each reproducing channel. To this end, however, the diameter of the rotary transformer must be increased, which will increase the overall size of the rotary transformer. Further, since the rotary transformer is disposed within a head drum, if the size of the rotary drum is increased, then the overall size of the head drum is increased, which will result in an increase in the overall size of the magnetic recording and reproducing device and an increase in the cost of the device.

Due to such circumstances as described above, conventional magnetic recording and reproducing devices are not provided with a simultaneous recording and reproduction monitoring function.

SUMMARY OF THE INVENTION

It is an object of the present invention to provide a magnetic recording and reproducing device which eliminates such problems as described hereinabove and has a simultaneous recording and reproduction monitoring function without giving rise to an increase in the overall size of a head cylinder and also in the cost.

In order to attain the object, according to the present invention, a rotary transformer comprises a single recording channel common to n recording magnetic heads (n is an integer equal to or greater than 2) on a rotary drum, and n reproducing channels, one for each of n reproducing magnetic heads, and the recording channel is disposed on either an outermost circumference side or on an innermost circumference side of the rotary transformer.

Since the rotary transformer includes only one recording channel irrespective of the number of the recording magnetic heads, the distance between adjacent channels can be increased, and accordingly the degree of coupling at the reproducing channels can be increased and the transmission loss of a reproduction signal can be reduced.

Further, since the recording channel is disposed either on the outermost circumference side or the innermost circumference side of the rotary transformer, the distance between adjacent channels can be further increased. Consequently, the degree of coupling at the reproducing channels can be further increased and the transmission loss in the reproducing channels can be further reduced. In this instance, while the magnetic reluctance at a magnetic path of the recording channel is increased and accordingly the degree of coupling is reduced and the transmission loss is reduced because the recording channel is disposed near an outer or inner periphery of the rotary transformer; the transmission loss can be compensated for if the characteristic of recording current is suitably adjusted at a recording circuit.

DETAILED DESCRIPTION OF THE PREFERRED EMBODIMENT

In the following, an embodiment of the present invention will be described with reference to the drawings by way of example of a DAT.

Figure 1:
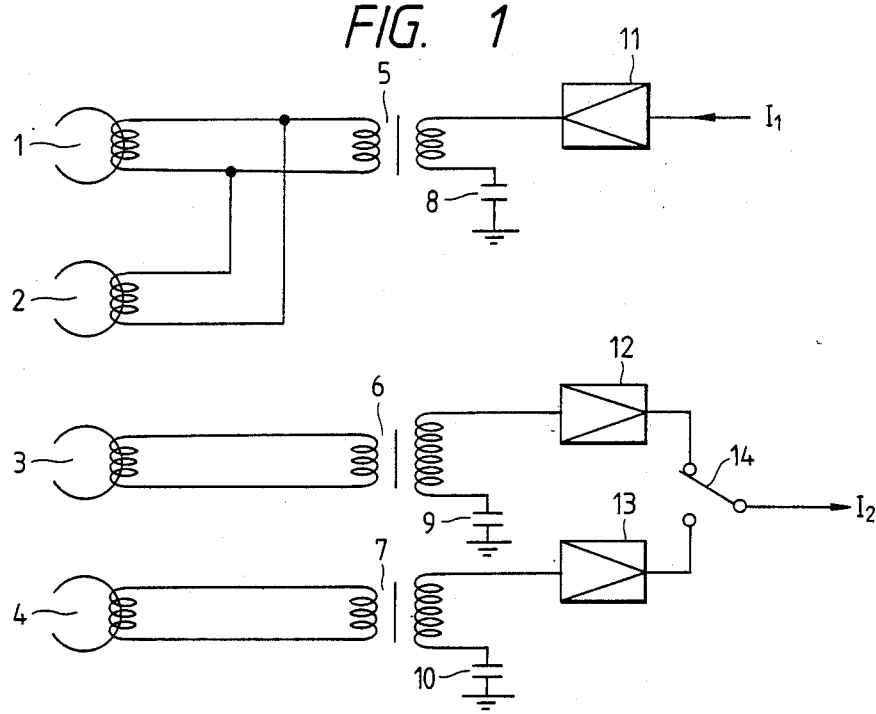
FIG. 1 is a circuit diagram of a recording and reproducing device showing a preferred embodiment of the present invention.

FIG. 1 is a circuit diagram showing a magnetic recording and reproducing device according to a preferred embodiment of the present invention, and reference numerals 1 and 2 denote recording magnetic heads, 3 and 4 reproducing magnetic heads, reference numeral 5 denotes a recording channel of a rotary transformer, reference numerals 6 and 7 denote reproducing channels of the rotary transformer, 8 to 10 floating capacitances appearing in windings and so on of the rotary transformer, reference numeral 11 denotes a recording amplifier, reference numerals 12 and 13 denote reproducing amplifiers, and reference numeral 14 denotes a switch.

In FIG. 1, two recording magnetic heads 1 and 2 and two reproducing magnetic heads 3 and 4 are used as follows. A rotary transformer is provided with a single recording channel 5 and two reproducing channels 6 and 7. The recording magnetic heads 1 and 2 are connected in parallel to the recording channel 5, and the reproducing magnetic head 3 is connected to the reproducing channel 6 while the reproducing magnetic head 4 is connected to the reproducing channel 7. Thus, a recording signal $I_1$ is first amplified by a recording amplifier 11, then transmitted by the recording channels 5, and finally supplied to the recording magnetic heads 1 and 2. On the other hand, a reproduction signal of the reproducing magnetic head 3 or 4 is transmitted by the reproducing channel 6 or 7 and then amplified by one of a pair of reproducing amplifiers 12 and 13, respectively, and then one of such reproduction signals of the reproducing magnetic heads 3 and 4 is selected by a switch 14.

Figure 2:
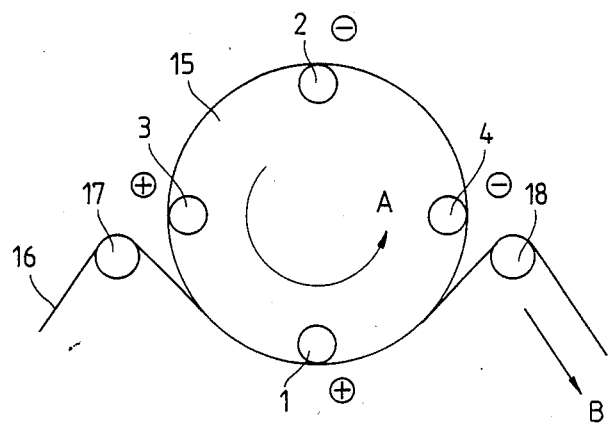
FIG. 2 is a plan view illustrating an arrangement of magnetic heads shown in FIG. 1 relative to a head drum.

The recording magnetic heads 1 and 2 and the reproducing magnetic heads 3 and 4 are disposed on a rotary drum of a head drum 16 as shown in FIG. 2.

In particular, if it is assumed that the direction of rotation of the rotary drum of the head drum 15 coincides with the direction indicated by an arrow mark A, the recording magnetic head 1, reproducing magnetic head 3, recording magnetic head 2 and reproducing magnetic head 4 are disposed at angular intervals of 90 degrees in this order in the opposite direction to the direction of rotation of the rotary drum. A magnetic tape 16 contacts over 90 degrees around an outer periphery of the rotary drum 15 under the guidance of a pair of tape guides 17 and 18 and is fed in the direction indicated by an arrow mark B. Where the magnetic tape 16 is thus fed in the direction of the arrow mark B and the rotary drum is rotated in the direction of the arrow mark A, the magnetic tape 16 is scanned successively by the recording magnetic head 1, reproducing magnetic head 3, recording magnetic head 2 and reproducing magnetic head 4 in this order. In this instance, the relative mounting positions of the recording magnetic head 1 and the reproducing magnetic head 3 in the direction of rotation of the rotary drum 15 are set such that scanning loci of the heads 1 and 3 on the magnetic tape 16 may coincide with each other, and the relative mounting positions of the recording magnetic head 2 and the reproducing magnetic head 4 are set in a similar manner. However, the recording magnetic heads 1 and 2 are disposed on a same rotational plane of the rotary drum so that the scanning loci thereof on the magnetic tape 16 may be different from each other. Here, azimuth recording is carried out. Accordingly, the recording magnetic heads 1 and 2 are different in azimuth angle from each other. Thus, if it is assumed that the recording magnetic head 1 is set to $\oplus$ azimuth while the recording magnetic head 2 is set to $\ominus$ azimuth, then the reproducing magnetic head 3 is set to $\oplus$ azimuth similar to the recording magnetic head 1 while the reproducing magnetic head 4 is set to $\ominus$ azimuth similar to the recording magnetic head 2.

Referring to FIGS. 1 and 2, upon recording of a digital audio signal, a recording signal $I_1$ is supplied to the recording magnetic heads 1 and 2 via the amplifier 11 and the recording channel 5 by means of which it is recorded on the magnetic tape 16 for one fourth rotation period for one half rotation of the rotary drum alternately by the recording magnetic heads 1 and 2. Since tracks formed on the magnetic tape 16 by the recording magnetic heads 1 and 2 are different in direction of magnetization from each other and the azimuth recording system is employed, the tracks can be formed without a guard band.

After the recording magnetic head 1 has made a recording of the recording signal $I_1$ on the magnetic tape 16, the track formed by such recording is scanned for reproduction by the reproducing magnetic head 3. A reproduction signal developed from the reproducing magnetic head 3 by such scanning is sent to the switch 14 via the reproducing channel 6 and the reproduction amplifier 12. The switch 14 is held closed to the reproduction amplifier 12 side while the reproducing magnetic head 3 continues scanning for reproduction of the magnetic tape 16. Accordingly, a reproduction signal developed from the reproducing amplifier 12 passes the switch 14. Subsequently, if the recording magnetic head 2 makes a recording of the recording signal $I_1$ on the magnetic tape 16, then the track formed by such recording is scanned for reproduction by the reproducing magnetic head 4. In this instance, the switch 14 is closed to the reproducing amplifier 13 side. Consequently, a reproduction signal of the reproducing magnetic head 4 passes the reproducing channel 7 and the reproducing amplifier 13 and further passes the switch 14. The reproduction signal $I_2$ from the switch 14 is supplied to a reproduction signal processing circuit not shown.

The operation described above is operation during one complete rotation of the rotary drum, and as the rotary drum is rotated, the operation is repeated naturally.

FIGS. 3A to 3E illustrate timings at which the recording signal $I_1$ is supplied to the recording magnetic heads 1 and 2 and timings at which reproduction is made by the reproducing magnetic heads 3 and 4, and FIGS. 3B, 3D, 3C and 3H illustrate such operation timings of the recording magnetic heads 1 and 2 and the reproducing magnetic heads 3 and 4, respectively.

Figure 3A:
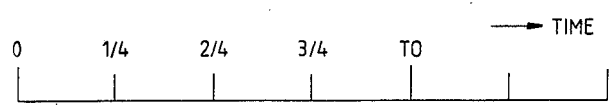
FIGS. 3A to 3E are diagrams illustrating operation timings of the magnetic heads shown in FIG. 1.
Figure 3B:
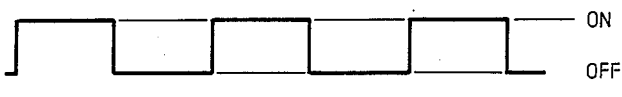
Figure 3C:
Figure 3D:
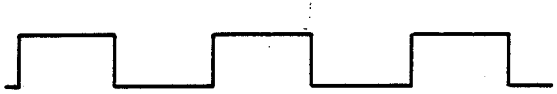

Referring first to FIG. 3A, it is assumed that the time "0" is a point of time at which the recording magnetic head 1 starts its scanning of the magnetic tape 16 and "$T_0$" is a period of time required for the rotary drum to make one complete rotation. While the recording magnetic tape head 1 scans the magnetic 16 for a period of time from the point 0 of time to another point $T_0/4$ of time, the recording signal $I_1$ continues to be supplied to both of the recording magnetic heads 1 and 2. Referring to FIGS. 3B and 3D, if the high level of a signal is represented as an on state and the low level as an off state, then the on state indicates that the recording signal $I_1$ is being supplied. Also for a period of time from a point $2T_0/4$ of time to another point $3T_0/4$ of time, the heads 1 and 2 are held in the on state, but in this instance, the recording magnetic head 2 scans the magnetic tape 16 while the recording signal $I_1$ is supplied to both of the recording magnetic heads 1 and 2.

In this manner, the recording signal $I_1$ is supplied only for a period of time while either one of the recording magnetic heads 1 and 2 continues its scanning. Accordingly, the recording signal $I_1$ is an intermittent signal.

Figure 3E:

The reproducing magnetic head 3 reproduces a signal from the magnetic tape for a period of time from the point $T_0/4$ of time to the point $2T_0/4$ of time. Referring to FIGS. 3C and 3E, if the high level is represented as an on state and the low level as an off state, then the on state indicates reproduction of a signal. The head 4 is held in the on state for a period of time from the point $3T_0/4$ of time to the point $T_0$ of time and thus reproduces a signal from the magnetic tape 16.

In this manner, reproduction of a signal is carried out for one fourth rotation period for one half rotation of the rotary drum 15 by the reproducing magnetic heads 3 and 4, and accordingly the reproduction signal is an intermittent signal similar to the recording signal, and is obtained from the switch 14.

As the recording signal $I_1$ and the reproduction signal $I_2$ are both intermittent signals and are displaced in timing such that they may not overlap each other, no current flows through the recording channel 5 for any signal reproducing period by the reproducing magnetic head 3 or 4. Consequently, no crosstalk will be caused in the reproducing channel 6 or 7 from the recording channel 5. Indeed crosstalk may be caused in the reproducing channels 6 and 7 from the recording channel 5 for a period of time when the recording signal $I_1$ is supplied to the recording magnetic heads 1 and 2, since the period is a period for which reproduction of a signal is stopped, the crosstalk can be readily removed from the reproduction signal $I_2$ by the reproduction signal processing circuit not shown.

Recording of a signal by the recording magnetic heads 1 and 2 is saturation recording. Therefore, where the recording channel 5 is used commonly for the recording magnetic heads 1 and 2, recording current is distributed to the two recording magnetic heads 1 and 2. Accordingly, recording current is reduced in magnitude. However, if the amplification degree of an amplifier of a recording signal processing circuit not shown or of the amplifier 11 is suitably set, then a recording signal to be supplied to the recording magnetic heads 1 and 2 can have an optimum magnitude for saturation recording.

To the contrary, the reproduction signal of the reproducing magnetic head 3 or 4 is a feeble signal. Accordingly, if a reproducing channel is used commonly for the two reproducing magnetic heads 3 and 4, since one of the reproducing magnetic heads 3 and 4 is connected in parallel to the reproducing channel as viewed from the other reproducing magnetic head 4 or 3, a reproduction signal of the other reproducing magnetic head 4 or 3 will flow not only into the reproducing channel but also into the one reproducing magnetic head. This will cause losses so that the magnitude of the reproduction signal passing the reproducing channel will be further reduced, resulting in a deterioration in the S/N ratio.

For this reason, the rotary transformer includes individual reproducing channels 6 and 7 for the reproducing magnetic heads 3 and 4, and in order to amplify a reproduction signal by them, they have a high turn number ratio.

Figure 4:
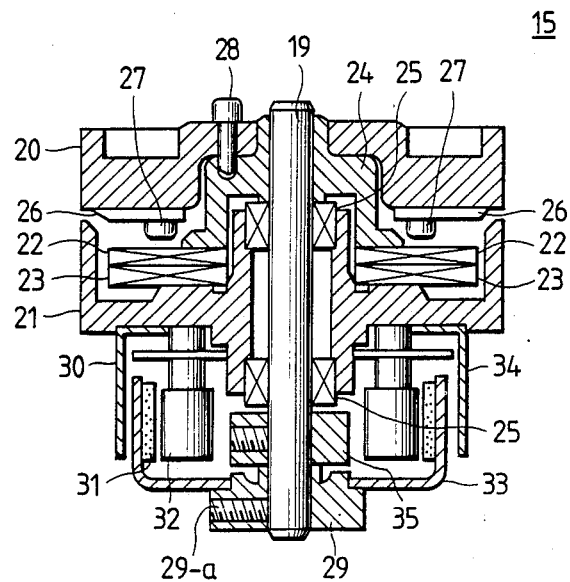
FIG. 4 is a vertical sectional view of the head drum shown in FIG. 2.

FIG. 4 is a vertical sectional view showing an example of the head drum 15 shown in FIG. 1, and reference numeral 19 denotes a rotary shaft, 20 a rotary drum, 21 a fixed drum, 22 a rotor of the rotary transformer, 23 a stator of the rotary transformer, 24 a disk, 26 a ball bearing, 26 a head base, reference numerals 27, 28 denote screws, reference numeral 29 denotes a holder fixing metal member, 30 a stator, 31 a rotor magnet, 32 a stator coil, 33 a rotor holder, 34 a stator coil holder, and 35 a pressure applying metal member.

In the same figure, an upper end side of a rotary shaft 19 is press fitted in a disk 24, and a rotor 22 of the rotary transformer is securely mounted on a lower end face of the disk 24. Meanwhile, a rotary drum 20 is mounted at an upper portion of the disk 24 by means of a screw 28. Four head bases 26 (only two are shown) having the recording magnetic heads 1 and 2 and the reproducing magnetic heads 3 and 4 individually carried thereon are secured to a lower end face of the rotary drum 20 each by means of a screw 27 such that the arrangement described hereinabove in connection with FIG. 2 may be established. Rotary side coils constituting the recording channel 5 and the reproducing channels 6 and 7 (FIG. 1) are provided on the rotor 22, and such a connection as shown in FIG. 1 is provided between the coils and the recording magnetic heads 1 and 2 and the reproducing magnetic heads 3 and 4. Ball bearings 25 are press fitted at two locations of the rotary shaft 19 below the disk 24, and a fixed drum 21 is mounted on the ball bearings 25. A stator 23 of the rotary transformer is securely mounted in an opposing relationship to the rotor 22 within the fixed drum 21.

A stator coil holder 34 is secured to an outer side bottom face of the fixed drum 21, and a stator coil 32 is held by the stator coil holder 34. Meanwhile, a holder fixing metal member 29 is secured to a lower end portion of the rotary shaft 19 by means of a screw (not shown) screwed in a threaded hole 29-a formed in the holder fixing metal member 29. A cylindrical rotor holder 33 having a bottom portion is caulked at the bottom portion thereof to the holder fixing metal member 29, and an annular rotor magnet 31 is securely mounted on an inner side face of the rotor holder 33. The stator coil 32 is disposed in an opposing relationship on the inner side of the rotor magnet 31. The rotor magnet 31 and the stator coil 32 cooperate with each other to constitute a drum motor.

A pressure applying metal member 35 is provided between the lower ball bearing 25 and the holder fixing metal member 29 and defines the positions in the thrust direction of the rotary members including the rotary drum 20, the disk 24 and the rotor 22 of the rotary transformer all mounted in an integral relationship on the rotary shaft 19.

If driving current flows through the stator coil 32, the rotor magnet 31 is rotated by electromagnetic force produced between the stator coil 32 and the rotor magnet 31. Accordingly, the rotary shaft 19 is rotated and the rotary drum 20, the disk 24 and the rotor 22 of the rotary transformer are also rotated.

Figure 5:
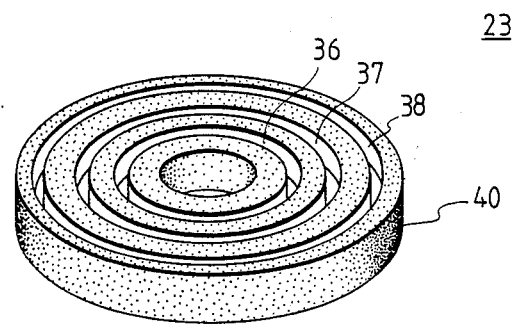
FIG. 5 is a perspective view showing a stator of a rotary transformer shown in FIG. 4.

FIG. 5 is a perspective view showing an example of the stator 23 shown in FIG. 4, and reference numerals 36 to 38 denote grooves, and reference numeral 40 denotes a magnetic member.

In the same figure, the stator 23 is formed as a disk-shaped magnetic member 40 having a through-hole formed at the center thereof. Three grooves 36 to 38 are formed in a concentrical relationship with the through-hole in the magnetic member 40, and a winding is received in each of the grooves 36 to 38. Also the rotor 22 has a similar structure.

The rotor 22 and stator 23 having such a structure as described just above are disposed such that grooves 36' to 38' formed in the rotor 22 may oppose to the grooves 36 to 38 of the stator 23, respectively, thereby constituting the rotary transformer. Windings 40 and 41 each having a predetermined number of turns are received in the grooves 38' and 38, respectively, thereby forming the recording channel 5 shown in FIG. 1. In particular, the winding 40 is connected to the recording magnetic heads 1 and 2 (FIG. 1) while the winding 41 is connected to the amplifier 11 (FIG. 1). Windings 42, 43 and 44, 45 are received in the grooves 37', 37 and 36', 36, respectively, thereby forming the reproducing channels 6 and 7 shown in FIG. 1, respectively. However, the ratio of the number of turns of the winding 43 to that of the winding 42 and the ratio of the number of turns of the winding 45 to that of the winding 44 are made large so that a reproduction signal may be amplified. The windings 42 and 44 are connected to the reproducing magnetic heads 3 and 4 (FIG. 1), respectively, while the windings 43 and 46 are connected to the amplifiers 12 and 13 (FIG. 1), respectively.

Figure 6:
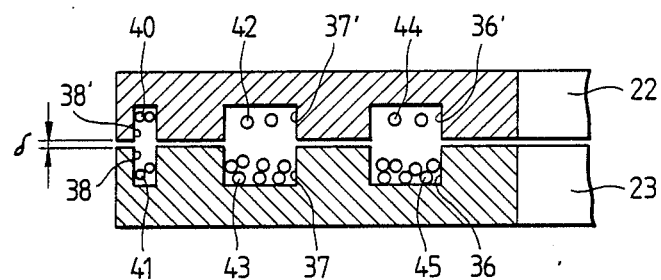
FIGS. 6 and 7 are alternative partial sectional views of the rotary transformer shown in FIG. 4.
Figure 7:
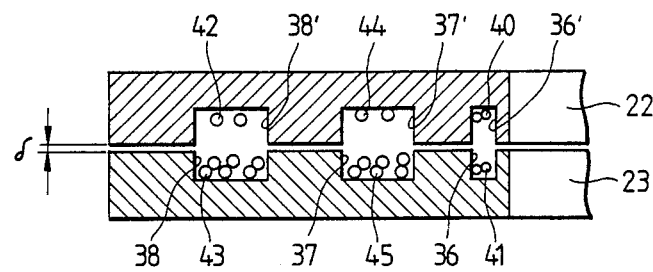

While in the example shown in FIG. 6 the recording channel is disposed in the grooves 38 and 38' on the outermost circumference side of the rotary transformer, the recording channel may otherwise be disposed in the grooves 36 and 36' on the innermost circumference side as shown in FIG. 7. It is to be noted that, in FIG. 7, like parts are denoted by like reference numerals to those of FIG. 6.

In the embodiment described above, the recording channel 5 (FIG. 1) is disposed either on the outermost circumference side or on the innermost circumference side of the rotary transformer as described above. In the following, the reason for this will be described.

Figure 8:
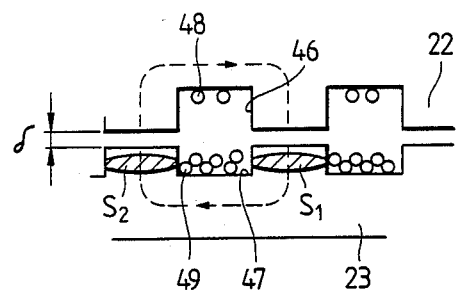
FIG. 8 is a schematic view illustrating a magnetic path of a channel of the rotary transformer shown in FIG. 4.

Referring to FIG. 8, if attention is paid to a channel formed by windings 48 and 49 received in a groove 46 of the rotor 22 and another groove 47 in the stator 23, a magnetic path of the channel includes core portions opposing in a spaced relationship by a distance $\delta$ on the left and right sides of the grooves 46 and 47 as indicated by a broken line arrow mark. If the opposing areas of the core portions are represented as $S_1$ and $S_2$, then the electric transmission characteristic of the channel depends upon the magnitudes of $S_1$ and $S_2$. In particular, if $S_1$ and $S_2$ increase, then the magnetic reluctance of the magnetic path of the channel decreases so that the amount of magnetic flux produced by electric current flow through the winding 48 increases while the transmission loss decreases.

If the channel is a reproducing channel, then the voltage of a reproduction signal obtained by scanning for reproduction of a magnetic tape by a reproducing magnetic head is very low. Accordingly, the signal transmission loss of the reproducing channel must be minimized. The degree K ($\leq 1$) of coupling of the transformer having such a reproducing channel as shown in FIG. 8 is represented by a following equation $$K = 1 - \frac{A}{S_1 + S_2}$$

and as the degree K of coupling approaches 1, the transmission loss decreases. Thus, as $S_1 + S_2$ increases, the degree K of coupling approaches 1 and the transmission loss decreases. Accordingly, the reproducing channel must have such a construction that $S_1$ and $S_2$ thereof have individually great values.

Figure 9:
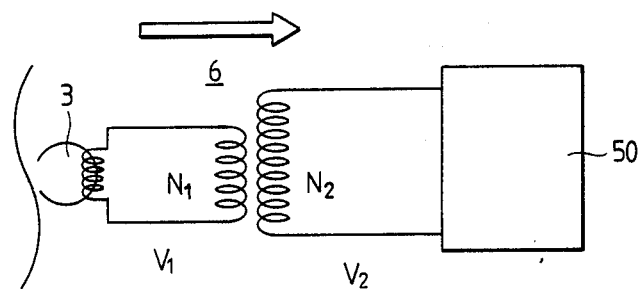
FIG. 9 is a circuit diagram illustrating an action of a reproducing channel of the rotary transformer shown in FIG. 4.

By the way, if the number of turns on the stator 23 side is represented as $N_2$ and the number of turns on the rotor 22 side is represented as $N_1$, in the case of a reproducing channel, the turn number ratio $N_2/N_1$ has a value sufficiently greater than 1. Accordingly, if attention is paid to the channel of the reproducing magnetic head 3 in FIG. 9, the voltage $V_1$ of a reproduction signal of the reproducing magnetic head 3 is amplified to $$V_2 = \frac{N_2}{N_1} V_1$$

by the reproducing channel 6 before it is supplied to a reproducing circuit 50. Consequently, a reproduction signal is restrained from a deterioration in the S/N ratio which may be caused by noises such as an external magnetic field. In this manner, in the case of a reproducing channel, a winding must have a large number of turns. Thus, the grooves 37 and 36 of the stator 23 shown in FIG. 6 have a sufficiently great size to allow them to receive therein the windings 43 and 45, respectively, which have relatively large numbers of turns, and consequently the grooves 37' and 36' of the rotor 22 opposing the grooves 37 and 36, respectively, must have similarly great sizes. This also applies to the grooves 38, 38' and 37, 37' shown in FIG. 7.

Figure 10:
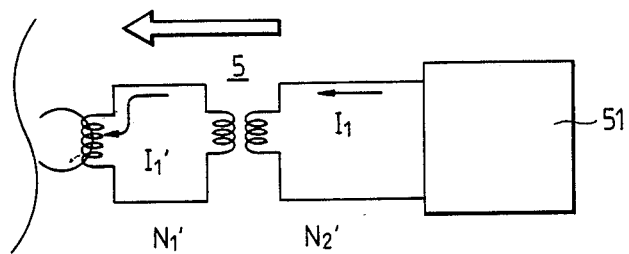
FIG. 10 is a similar view but illustrating an action of a recording channel of the rotary transformer shown in FIG. 4.

To the contrary, in the case of the recording channel 5, if the number of turns of the winding on the rotor side is represented as $N_1'$ while the number of turns of the winding on the stator side is represented as $N_2'$ and the recording current from a recording circuit 51 is represented as $I_1$ as illustrated in FIG. 10, current $I_1'$ calculated from $$I_1' = \frac{N_1}{N_2} I_1$$

is produced by the recording channel 5 and supplied to the recording magnetic head. The recording and reproducing device has an optimum recording current depending upon a tape and head system, and such recording current $I_1$ that will make the recording current $I_1'$ equal to the optimum recording current is delivered from the recording circuit 51.

Since the recording current $I_1'$ can be set to the optimum recording current by the recording circuit 51 in this manner, the numbers of turns $N_1'$ and $N_2$ can be made substantially equal to each other and as such can be reduced. Consequently, grooves 38' and 38 for receiving the windings 40 and 41 therein as shown in FIG. 6 and grooves 36' and 36 as shown in FIG. 7 can be individually made of a reduced size.

On the other hand, if the opposing areas $S_1$ and $S_2$ of the core portions on the opposite sides of the grooves 46 and 47 in FIG. 8 are reduced, the degree K of coupling described above is decreased sufficiently smaller than 1, and the signal transmission characteristic (particularly the frequency characteristic of a signal transmission level) is deteriorated. However, even if there is such deterioration of the transmission characteristic in the recording channel, it can be compensated for by, for example, the recording circuit 51 (FIG. 10) if the signal level in the deteriorated frequency zone is raised.

Accordingly, if the groove for the recording channel is disposed either on the outermost circumference side or on the innermost circumference side of the rotary transformer as shown in FIG. 6 or 7, then it is possible to minimize the opposing areas of the core portions adjacent the recording channel and increase the opposing areas of the core portions adjacent to the grooves for the reproducing channels.

It is to be noted that while in the embodiment described above the rotary transformer has a flattened configuration, the present invention can be applied also to a rotary transformer having any other configuration such as a cylindrical configuration.

As described so far, according to the present invention, a single recording channel of a rotary transformer is used commonly for a plurality of recording magnetic heads and disposed either on an outermost circumference side or on an innermost circumference side of the rotary transformer. Accordingly, the distance between adjacent channels on the rotary transformer can be increased. Consequently, a possible increase in size of the rotary transformer can be avoided and the transmission loss in a reproducing channel can be reduced significantly.

What is claimed is:

1. A magnetic recording and reproducing device wherein n recording magnetic heads and n reproducing magnetic heads are carried on a rotary drum, n being an integer equal or greater than 2, and a recording signal is supplied to said recording magnetic heads and reproduction of a signal by said reproducing magnetic heads is performed by way of a flattened rotary transformer, characterized in that said rotary transformer is provided with a single recording channel for transmitting a recording signal simultaneously to said recording magnetic heads and n reproducing channels for transmitting a reproduction signal individually from said reproducing magnetic heads, said recording channel being disposed on at least one of an outermost circumference side and an innermost circumference side of said rotary transformer, said recording channel and said n reproducing channels include windings received in respective concentric grooves which are formed on mutually opposing surfaces of a rotor and a stator of said rotary transformer such that a sum total of surface areas of portions of said rotor and said stator which are located on adjacent sides of the grooves formed for said recording channel is smaller than a sum total of surface areas of portions of said rotor and said stator which are located on adjacent sides of the grooves formed for any one of said n reproducing channels.

2. A magnetic recording and reproducing device according to claim 1, characterized in that a magnetic tape is fed while contacting over an angular range of 360/n degrees with an outer periphery of said rotary drum, and said recording magnetic heads and said reproducing magnetic heads are disposed in an angularly equidistantly spaced relationship on said rotary drum such that a scanning locus of each of said recording magnetic heads on the magnetic tape may coincide with a scanning locus of one of said reproducing magnetic heads which scans the magnetic tape subsequent to the recording magnetic head.

3. A magnetic recording and reproducing magnetic device according to claim 1, characterized in that the cross-sectional area of the grooves for said recording channel in a plane substantially transverse to the circumferential direction of said grooves is smaller than that of the grooves for each of said reproducing channels.

* * * * *